Dec. 31, 1935.  E. C. JACKSON ET AL  2,026,044
RAILWAY TRUCK
Filed Dec. 19, 1932  4 Sheets-Sheet 1
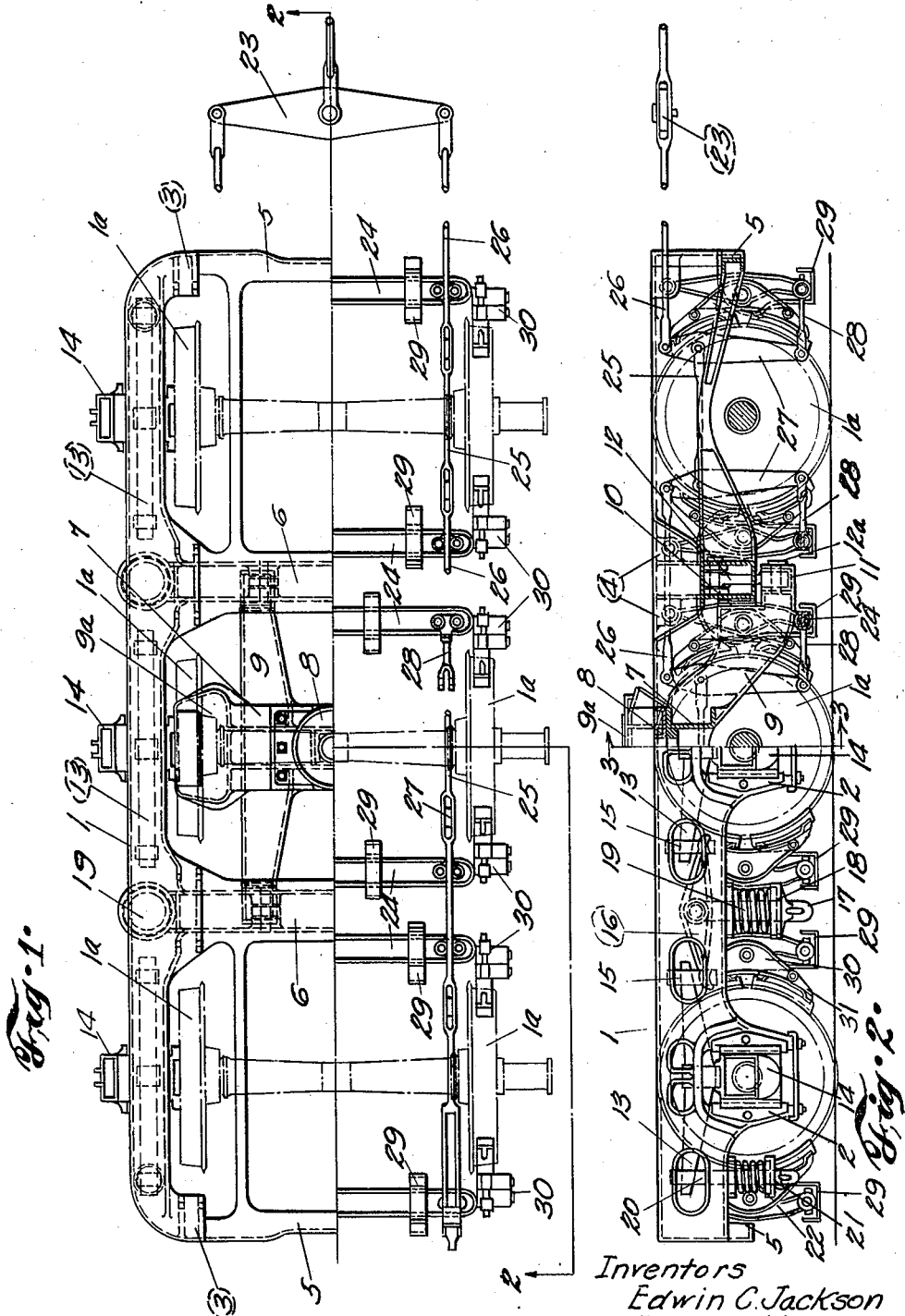
Inventors
Edwin C. Jackson
Einar G. Hallquist
By
Attorney Dec. 31, 1935.  E. C. JACKSON ET AL  2,026,044

RAILWAY TRUCK

Filed Dec. 19, 1932  4 Sheets-Sheet 2

Inventors
Edwin C. Jackson
Einar G. Hallquist
By Rodney Bedell
Attorney

Dec. 31, 1935.  E. C. JACKSON ET AL  2,026,044
RAILWAY TRUCK
Filed Dec. 19, 1932  4 Sheets-Sheet 3
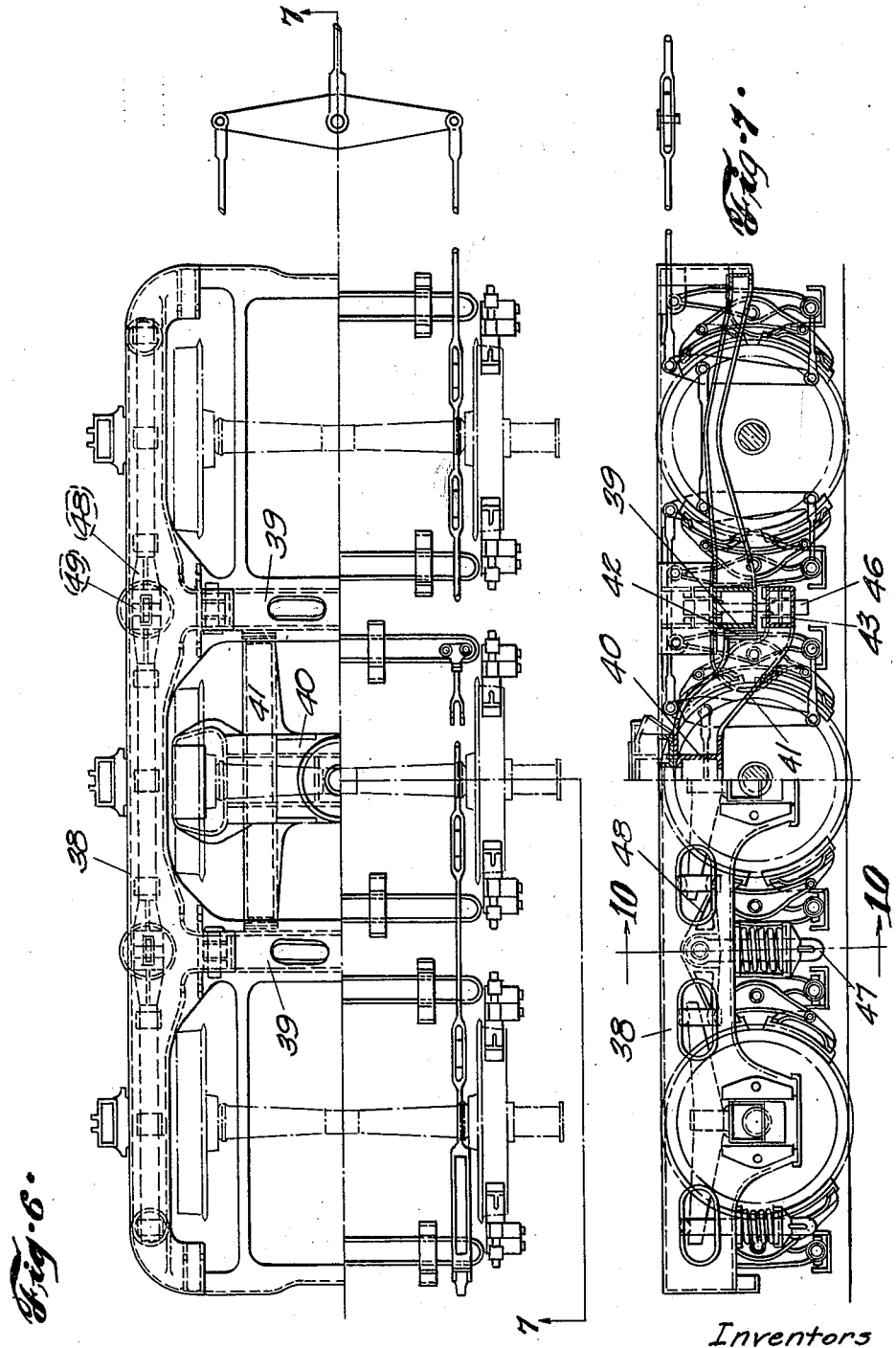
Inventors
Edwin. C. Jackson
Einar G. Hallquist
By Rodney Bedell
Attorney

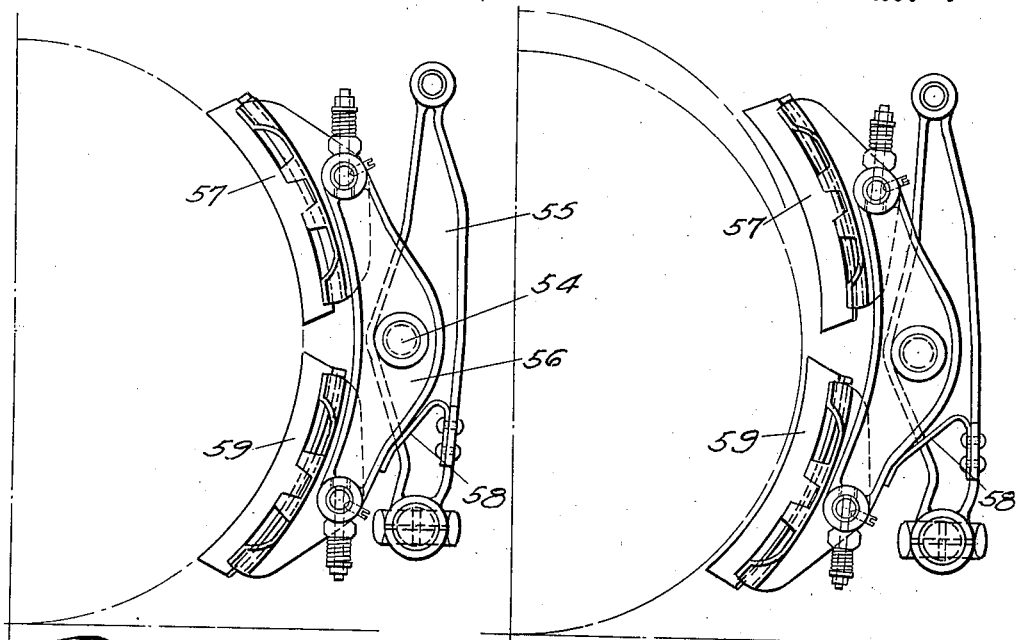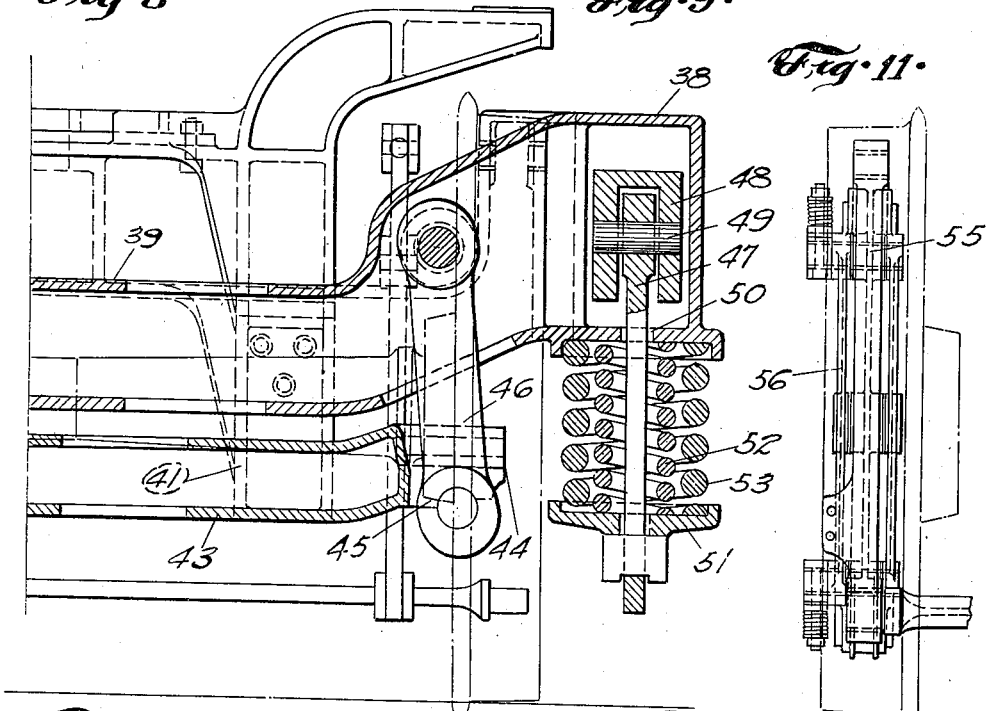

Patented Dec. 31, 1935

2,026,044

UNITED STATES PATENT OFFICE 2,026,044

RAILWAY TRUCK

Edwin C. Jackson, St. Louis, Mo., and Einar G. Hallquist, Wallingford, Pa., assignors to General Steel Castings Corporation, Granite City, Ill., a corporation of Delaware Application December 19, 1932, Serial No. 647,972

3 Claims. (Cl. 105—195)

This invention relates to railway rolling stock and consists in a novel truck construction.

In order for railroads to increase the speed of trains to better compete with airplane travel, it is necessary to provide a truck having improved riding qualities and also better braking facilities than are embodied in trucks now in use. This is for the reason that it would be desirable to run trains at much higher speeds than at present.

Co-pending application, Serial No. 640,763, filed November 2, 1932 by Harry M. Pflager, discloses a novel clasp brake arrangement providing for the use of four brake shoes to each wheel, which permits the application of increased braking force without excessive heating of the brake shoes. However, in order to accommodate the construction therein illustrated, the truck frame must be longer than is necessary with the use of present types of brake rigging.

One object of the present invention is to provide a compact truck and brake rigging assembly permitting the application of four brake shoes to each wheel without lengthening the wheel base of the truck over ordinary construction.

Another object of the present invention is to provide a truck which will have satisfactory riding qualities at high speeds.

These objects and others are attained substantially by supporting the truck frame on a spring equalizer system including semi-elliptical and coiled springs located entirely outside the wheels and substantially within the box section side frame, and by providing a bolster having longitudinal arms hung directly from the truck transoms by swing hangers, the spring plank being eliminated, and the bolster arms terminating short of the frame supporting springs and the brake members which are applied to the wheels.

In the accompanying drawings which illustrate the invention—

Figure 1 is a top view of a truck, the lower half showing the brake rigging, wheels and axles only.

Figure 2 is in part a side view of the truck, and in part a vertical longitudinal section on the line 2—2 of Figure 1.

Figures 6 and 7 are views corresponding to Figures 1 and 2, respectively, and illustrate a modification.

Figures 8 and 9 are detail side views of a portion of the brake rigging shown in Figures 6 and 7, the rigging being illustrated in different positions.

Figure 10 is a half vertical transverse section taken on the line 10—10 of Figure 7.

Figure 11 is an end view of the rigging shown in Figures 8 and 9.

Figure 3:
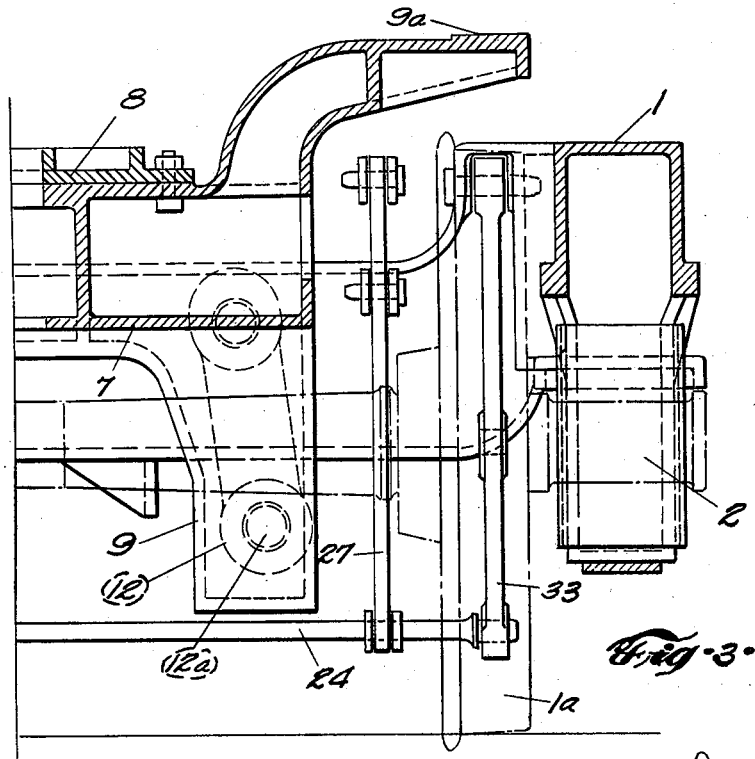
Figure 3 is a half vertical transverse section taken on the line 3—3 of Figure 2.
Figures 4, 5:
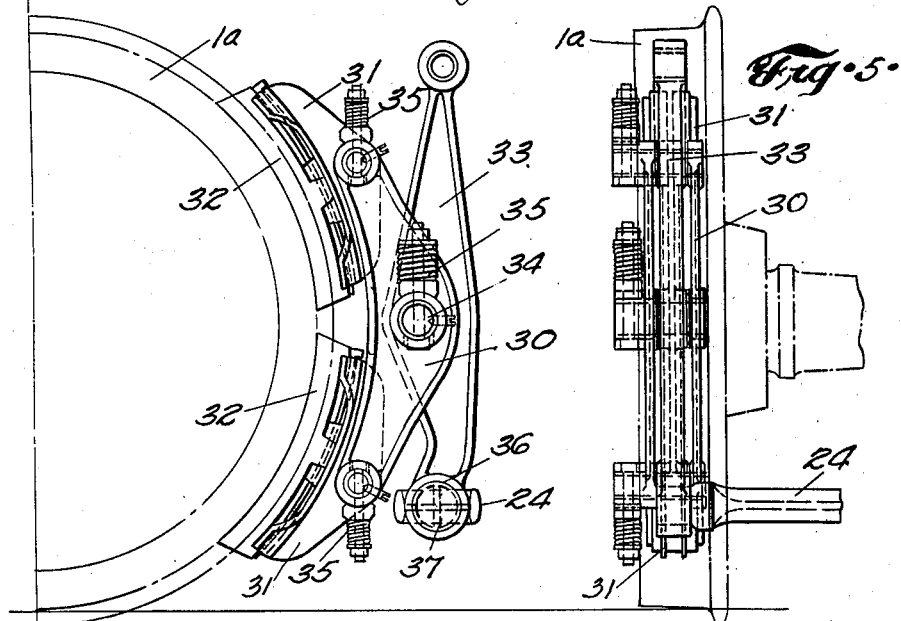
Figures 4 and 5 are detail side and end views, respectively, of a portion of the brake rigging and associated wheel.

In Figures 1 to 5, the truck frame includes box-section side members or wheel pieces 1 including pedestal jaws 2 and brake hangar brackets 3 and 4, end sills 5 and box-section intermediate transoms 6. The intermediate portions of the transoms and end sills are depressed beneath the upper surfaces of the side frames in order to lower the center of gravity of the truck and to clear body underframe structure. Between the transoms 6 is a bolster 7 mounting a center plate 8 and having a pair of transversely spaced longitudinal arms 9 and elevated side bearing portions 9a. The arms 9 are inclined downwardly on each side of the bolster and at their ends are provided with vertical surfaces 10, opposing the adjacent inside walls of the transoms 6 for limiting movement of the bolster longitudinally of the truck, and a portion 11 extending beneath the transom. Swing hangers 12, pivotally supported between the side walls of the transoms 6, extend below the lower walls thereof and pivotally support portions 11 of the bolster arms 9 by means of pins 12a. The outer ends of the bolster arms terminate a substantial distance short of springs 19.

The truck frame is supported by means of a spring equalizer system located entirely outside the truck wheels 1a and including semi-elliptical springs 13 mounted on journal boxes 14, shackles 15 depending from the ends of the springs, and equalizer bars 16 supported by the shackles 15. Pivotally hung from the center of each equalizer bar 16 is a hanger 17 mounting at the bottom a spring seat 18 carrying a coiled spring 19 which seats against and supports the under-surface of the truck side frame 1. Depending from the outer ends of the outermost semi-elliptical springs 13 are hangers 20 carrying spring seats 21 and coiled springs 22 which seat against and support the under-surface of the truck side frame at the outer ends.

The clasp brake rigging shown includes a transverse lever 23, overhead connecting rods 25 and 26, solid I-section brake beams 24, and brake levers 27 pivoted to fulcrum arms 28 near the outer extremities of the beams. Resilient brake release straps 29 are secured to the adjacent end sills and transoms and to the brake beams.

At the end of each beam is pivotally mounted a generally U-section brake equalizer 30 which at the ends pivotally mounts brake heads 31 and brake shoes 32. The equalizers and their associated brake heads and shoes are supported by means of hangers 33 depending from the hanger brackets 3 and 4, each hanger extending between the side walls of the equalizer and having a perforation receiving a pin 34 mounted in the side walls of the equalizer. The pivotal connections between each equalizer and hanger pin, and the equalizer and brake heads are provided with friction locks 35. The brake heads, shoes, and equalizers illustrated, as well as the friction locks, are in general similar to the corresponding parts more fully described in the co-pending application referred to above.

In order that the brake beams clear the portions 11 of the bolster arms 9 located beneath the transoms, each brake hanger 33 is formed as a lever having a lower portion extending a substantial distance beneath the equalizer connection. At the lower end, the hanger is perforated as at 36 to pivotally receive the cylindrical end portion 37 of the brake beam for operating the brakes.

In Figures 6 to 11, the truck frame including box-section side frames 38 and intermediate transoms 39, and the spring equalizer system supporting the frame, are in general similar to the corresponding parts of the form previously described, as are also the various parts of the brake rigging including the beams and equalized brake heads.

The bolster 40 has transversely spaced longitudinal arms 41 including vertical surfaces 42 opposing the inner walls of the transoms 39 and has portions extending beneath the transoms and connected by transverse box-section members 43. The members 43 extend outwardly of the arms 41 as at 44, and have bearings 45 for the lower ends of swing hangers 46. Each hanger at the upper end is pivoted to a transom 39 adjacent the side frame 38, this arrangement permitting the use of a longer hanger than the previous form, which results in easier transverse movement of the bolster and better riding qualities.

Figure 10 illustrates in section a portion of the equalizer system supporting the truck frame which is similar to that shown in the first form described. The hanger 47 is pivoted between the walls of the inverted U-section equalizer bar 48 by a pin 49 and extends through a perforation 50 in the lower wall of the box-section side frame 38. The hanger 47 mounts a disc spring seat 51 at the bottom and co-axial coil springs 52 and 53 which seat against and support the lower wall of the side frame.

In Figures 8 and 9, there is no friction lock cooperating with pin 54 pivotally connecting hanger 55 with equalizer 56. In order to prevent the upper brake shoe 57 from resting against the wheel tread in the released position of the brakes, a flat spring 58 is riveted to the rear flange of hanger 55 and slidably engages the rear surface of the equalizer 56 beneath the pivotal connection 54. As hanger 55 swings in a counterclockwise direction to move the brake shoes away from the wheel tread, equalizer 56 will pivot slightly about pin 54 in a clockwise direction causing the upper shoe 57 to move a farther distance from the wheel tread than the lower brake shoe 59, as more clearly illustrated in Figure 9. This will also prevent the wheel tread from striking the upper brake shoe as a result of relative vertical movement of the wheels and truck frame from which the brake heads and shoes are supported.

Member 58 may be rigid, if desired, instead of made of spring material, in which case relative rotation of the equalizer and brake hanger during release will be less pronounced.

The truck illustrated and described is peculiarly adapted to travel at high speeds because of its smooth riding qualities as well as its ruggedness and compactness combined with low center of gravity. Notwithstanding the increased length of brake shoe surface applied to the wheels and the increased size of hangers and the presence of the additional brake equalizer elements 30, the truck wheel base is not increased, thereby avoiding problems in lateral play of axles and wear on wheel flanges and journal elements which result from lateral thrusts. Obviously, the invention is not limited to the exact details illustrated but these may be modified in various respects as will occur to those skilled in the art, and the exclusive use of all such modifications as come within the scope of the appended claims is contemplated.

What is claimed is:

1. In a railway truck, wheels and a frame, brake heads for application to an opposing pair of said wheels, there being a truck bolster arm extending directly between said heads, brake hangers depending from said frame and having connections with said heads and having portions extending beneath said connections and beneath the level of said bolster arm, and a brake beam extending between said portions and clearing said bolster arm.

2. In a railway truck, an axle with wheels, brake elements for application to said wheels, a frame with wheel pieces and substantially depressed transoms, a bolster between said transoms and with longitudinal arms extending beneath and supported from said transoms, a portion of at least one of said arms being located directly between said brake elements, hangers supporting said elements from the truck frame, and a brake beam connecting portions of said hangers beneath said elements and extending beneath said last mentioned arm.

3. In a railway truck, opposing wheels connected by axles, pairs of brake elements for application to said wheels, a bolster with portions extending directly between the brake elements applied to each pair of opposing wheels, levers supporting said brake elements from the truck frame and with portions depending beneath said elements, and brake beams connecting the depending portions of each of said levers and extending beneath said bolster portions whereby said beams clear said bolster portions without lengthening of the truck.

EDWIN C. JACKSON.
EINAR G. HALLQUIST.